United States Patent Office 2,705,980
Patented Apr. 12, 1955

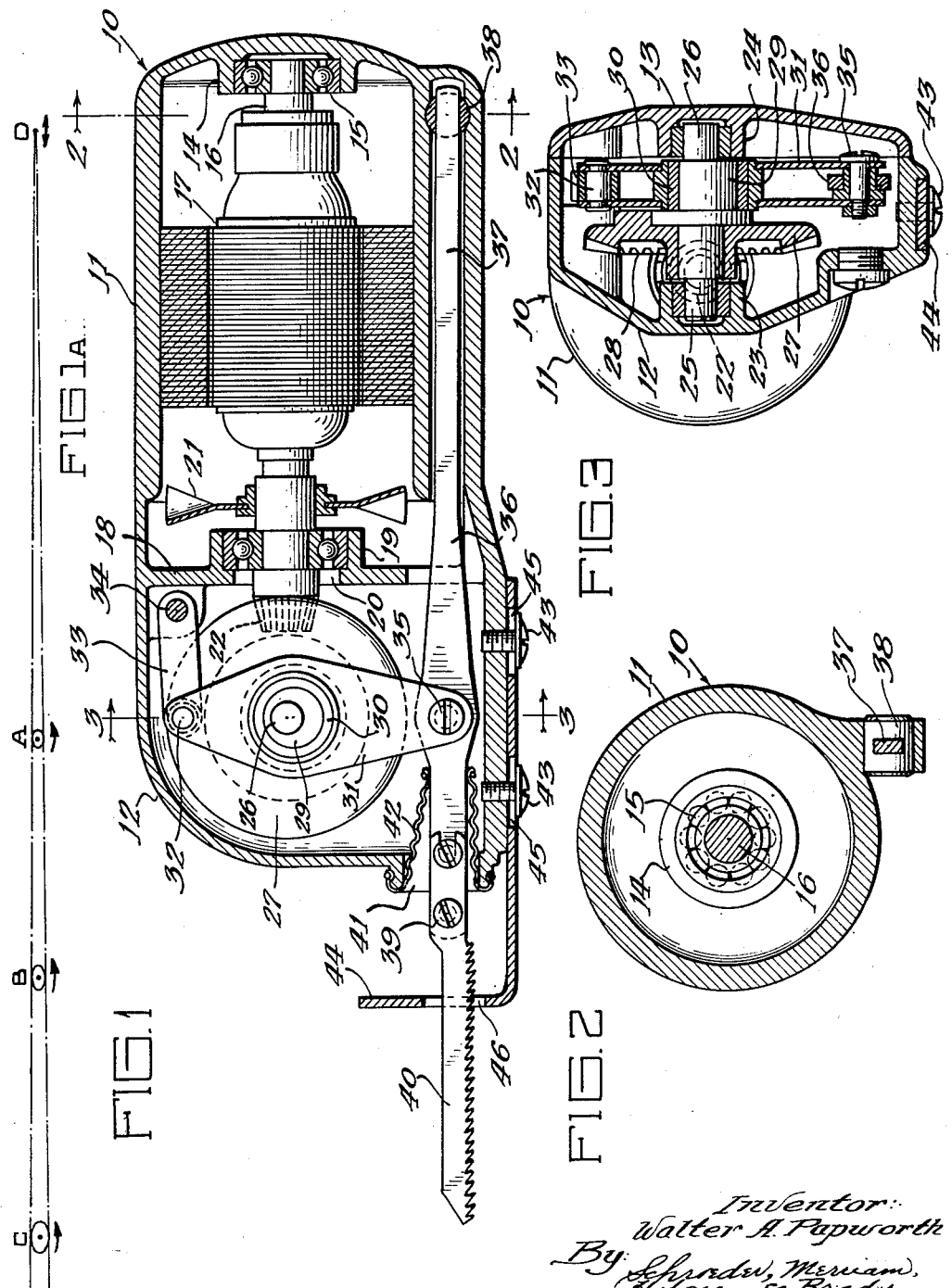

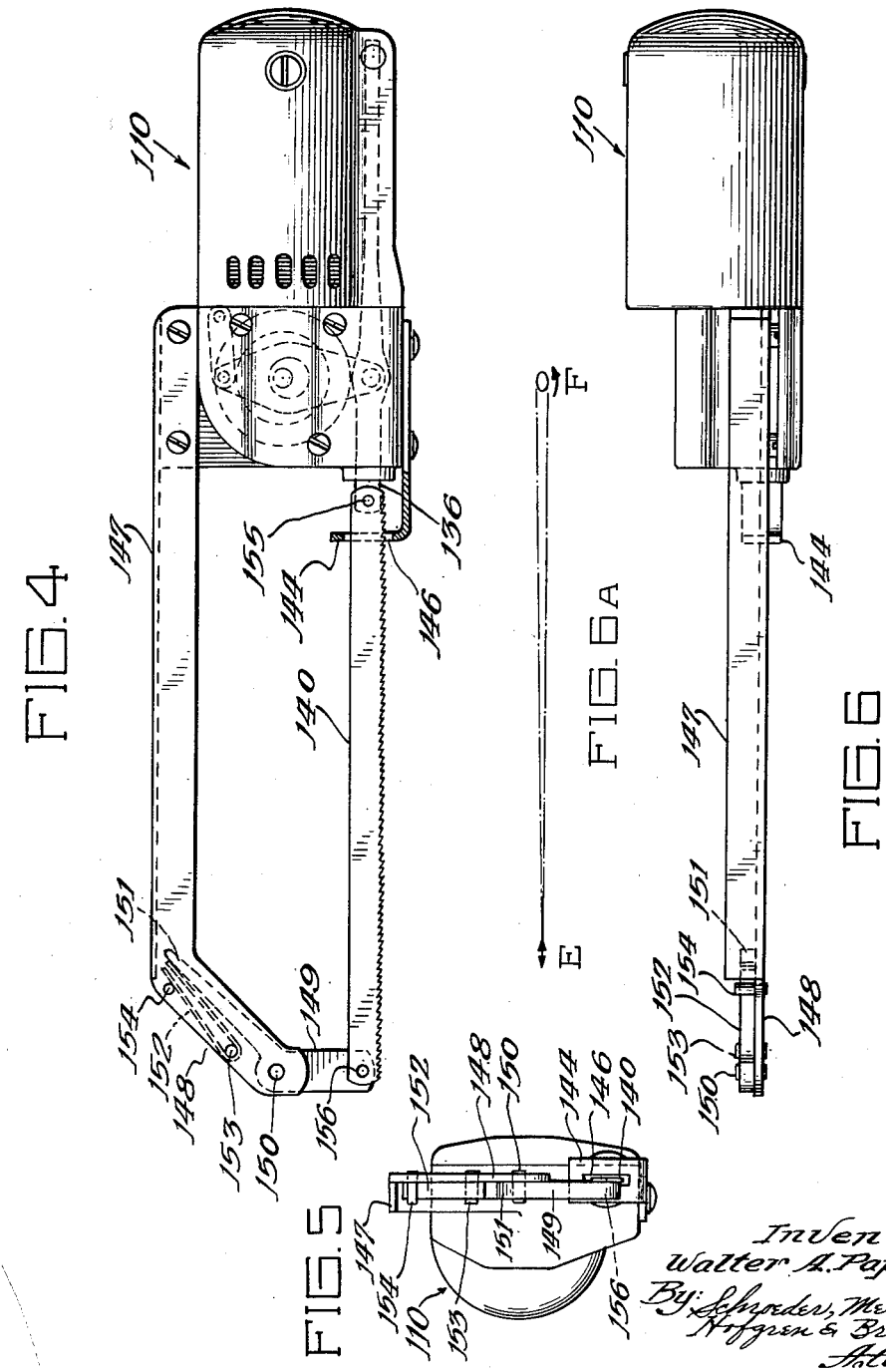

2,705,980

PORTABLE POWER DRIVEN RECIPROCATING AND OSCILLATING CUTTING TOOL

Walter A. Papworth, Syracuse, N. Y.

Application September 8, 1953, Serial No. 378,775

8 Claims. (Cl. 143—63)

This invention relates to portable power driven cutting tools, and in particular it relates to a device in which the cutting tool moves in an elliptical path. The invention is particularly applicable to power saws.

The principal object of the invention is to provide a portable power driven cutting tool which is extremely compact and utilizes a small motor to provide a rapid cutting action having high impact on resistant materials, good disposal of material dust, and considerable flexibility in cutting around curves and into corners.

Another object is to provide a portable power driven cutting tool in which an elliptical motion of the tool is produced with an extremely simple mechanism having few parts, which contributes to compactness and low cost.

In the device here disclosed, a tool plunger has one end supported for endwise and rocking movement in a frame, and is driven by a lever pivotally mounted upon a power driven eccentric, said lever having one end pivoted to the tool plunger intermediate its ends, and being linked so as to generate elliptical motion at its point of connection to the tool plunger. A cutting tool such as a saw, is secured to the free end of the tool plunger. Thus, the tool is driven in an elliptical path, the major axis of the path being longitudinal so as to fix the "travel," or "stroke," and being the same at different points on the tool; while the minor axis, which determines the "lift" of the tool, varies at different points from end to end of the tool.

The invention is illustrated in a preferred embodiment in the accompanying drawings in which:

Fig. 1 is a central vertical sectional view of a tool constructed in accordance with the invention;

Fig. 1a is a diagram of the path of movement of the tool plunger and cutting tool of the device of Fig. 1, showing particularly the paths of movement of the tool plunger and the tool at certain specific points;

Fig. 2 is a section taken as indicated along the line 2—2 of Fig. 1;

Fig. 3 is a section taken as indicated along the line 3—3 of Fig. 1;

Fig. 4 is a side elevational view of a modified form of the device applicable to a hacksaw, coping saw, scroll saw or the like;

Fig. 5 is a front elevational view of the device of Fig. 4;

Fig. 6 is a top plan view thereof; and

Fig. 6a is a diagram of the path of movement of the cutting tool of the device of Fig. 6, showing particularly the paths of movement of the tool at its inner and outer ends.

Referring to the drawings in greater detail, and referring first to Figs. 1–3, a frame, indicated generally at 10, includes a motor case frame portion 11, a gear case frame portion 12 and a gear case cover 13 (see Fig. 3). The motor case frame portion has an annular internal boss 14 at one end provided with a ball bearing assembly 15 to support one end of the shaft 16 of an electric motor 17. An internal partition 18 which separates the motor case 11 from the gear case 12 has a central mounting ring 19 for a ball bearing assembly 20 in which is journalled the opposite end of the motor shaft 16, and a small cooling fan 21 is affixed to the forward end of the shaft 16 between the motor and the bearing assembly 20. The shaft 16 extends through the bearing assembly 20 and has a bevel gear 22 at its forward end.

Referring now particularly to Fig. 3, the gear case 12 and gear case cover 13 are provided with registering trunnions 23 and 24, respectively, in which are journalled laterally projecting shaft portions 25 and 26 of an eccentric 27 which has peripheral teeth 28 in one face meshing with the bevel gear 22. The eccentric 27 has an eccentric bearing portion 29 to rotatably receive a journal 30 in a bifurcated lever 31, and a counter-balance portion 27a. At one end the lever 31 has a transversely extending pivot pin 32 to receive a link 33 which is pivotally connected to the gear case 12 at 34. At the end opposite the pivot pin 32 the lever 31 is provided with a transverse pin 35 which is pivotally connected to a tool plunger 36 which extends longitudinally of the frame 10. The tool plunger 36 has a long guide extension 37 which has its inner end slidably engaging a pivot support which, in the particular embodiment shown, consists of a slotted rock member 38 which is journalled in the frame 10. At the outer, or free end of the tool plunger 36 is a mounting means 39 for a cutting tool such as a saw 40. The free end of the tool plunger 36 extends through an opening 41 in the wall of the gear case 12, and a pliable diaphragm 42 is secured peripherally to the opening and to the tool plunger 36 to prevent lubricant from escaping from the gear case 12.

In the bottom of the gear case 12 are tapped apertures to receive machine screws 43 which adjustably support a work supporting foot 44 which is slotted at 45 for longitudinal adjustment with respect to the machine screws 43 and is also slotted at 46 so that the saw blade 40 may extend through the work supporting foot.

The operation of the tool is believed to be clear from the foregoing description. A suitable power cord and switch (not shown) are provided to supply current to and control operation of the electric motor 17, and when the motor is operating it acts through the bevel gear 22 to drive the eccentric 27 which causes the lever 31 at the journal 30 to move in a circle, but the restraining link 33 secured to the lever 31 causes the end of the lever which is pivoted at 35 to the tool plunger 36 to move in an elliptical path, thus causing elliptical movement of the tool plunger at that point. Since the inner end of the guide extension 37 on the tool plunger is guided in the frame 10 by means of the rock member 38 the tool plunger has generally endwise and rocking movement with respect to the frame 10 where it engages the rock member 38. The ellipses generated by the tool plunger 36 are of uniform major axis, or stroke, throughout the length of the tool plunger and blade 40, but the lift of the tool plunger varies from zero at the rock member 38 to a maximum at the outer end of the saw blade 40.

The use of a lever on an eccentric multiplies the throw permitting a relatively long stroke with small eccentricity. Thus, for example, with an eccentricity of .05 inch a 2.2 inch lever journalled 1.35 inches from its connection with the tool plunger, and a .9 inch restraining link on the lever, the stroke is .256 inch; and the "lift" varies from .10 at the pivot 35 to .14 at the inner end of a saw blade, about 2 inches from the pivot, to .18 at the outer end of a 2.2 inch blade.

This is clearly shown in Fig. 1a where the ellipse A shows the path of movement of the tool plunger at the pivot 35, the ellipse B shows the path of movement of the saw 40 at the rearmost teeth, and the ellipse C shows the path of movement of the outer end of the saw blade 40. The motion at the point D where the tool plunger is mounted in the rock member 38 is indicated as essentially straight longitudinal movement by means of the double headed arrow, while the direction of movement of the blade at the points A, B and C is also indicated by arrows. It is seen that the tool is rotated forwardly into the working face on the cutting stroke and removed from the work face on the return stroke.

Referring now to the form of the invention shown in Figs. 4, 5 and 6, a frame, indicated generally at 110, encases an operating mechanism which is identical to that shown in Figs. 1–3, and which thus will not be described in detail again, except to state that it includes a tool plunger 136, and that a work supporting foot 144 having a tool slot 145 is secured thereto. Extending forwardly from the frame 110 is a tool support 147 which has an inclined outer end portion 148 to receive a link 149 which is pivoted to the inclined outer end portion at 150. A long spur 151 on the link 149 is positioned alongside the inclined outer end portion 148 of the tool support 147, and a hairpin spring 152 is bent around a stud 153 and biased against a pin 154 to bear against the spur 151 and urge the link 149 outwardly with respect to the frame 110. A hacksaw or similar type of blade 140 is pivoted to the outer end of a tool plunger 136 at 155, and has its outer end pivoted to the link 149 at 156 so that the action of the spring 152 tensions the blade 140 between the tool plunger 136 and the link 149.

It is apparent from the foregoing description that when the modified form of the device is in operation the outer end of the saw blade 140, being pinned to the link 149 at 156, the elliptical path of the blade has the greatest lift adjacent the tool plunger 136, and the lift is reduced to zero at the pin 156 on the link 149, where the blade merely reciprocates and rocks about the pin.

The paths of the saw blade at its outer end and at its inner end are shown in Fig. 6a, which indicates by the double headed arrow at the point E that the outer end of the saw blade 140 where it is secured to the pivot 156 moves essentially longitudinally, while at the pivot 155 between the saw blade and the tool plunger 136 the ellipse F and the arrow indicate the path of movement of the blade at that point. At any point between the points E and F the blade moves in an ellipse having a major axis the same as that of the ellipse at the point F and having a minor axis smaller than that of the ellipse at the point F. Again, as in the device of Fig. 1, the saw blade is rotated toward the working face on its cutting stroke and removed therefrom on its return stroke.

The foregoing detailed description is given for clearness of understanding only and no unnecessary limitations are to be understood therefrom, as some modifications will be obvious to those skilled in the art.

I claim:

1. In a portable power driven cutting tool, a frame, guide means in said frame, a tool plunger in the frame with its inner end supported by said guide means for endwise and rocking movement with respect to said frame, a power driven eccentric rotatably supported in the frame, a lever pivotally mounted on said eccentric, said lever having one end pivotally connected to the tool plunger intermediate its ends to provide the sole driving connection between the eccentric and the tool plunger, and restraining means linking the other end of the lever to said frame to restrain said lever to elliptical movement where it is pivotally connected to the tool plunger, whereby the outer end of the tool plunger may move in an elliptical path while the inner end slides endwise and rocks without significant lateral movement.

2. In a portable power driven cutting tool, a frame, guide means in said frame, a tool plunger in the frame with its inner end supported in said guide means for endwise and rocking movement with respect to said frame, a power driven eccentric rotatably supported in the frame, a lever pivotally mounted on said eccentric, said lever having one end pivotally connected to the tool plunger intermediate its ends to provide the sole driving connection between the eccentric and the tool plunger, and a single link pivotally connected to the other end of the lever and to said frame to restrain said lever to elliptical movement where it is pivotally connected with the tool plunger, whereby the outer end of the tool plunger may move in an elliptical path while the inner end slides endwise and rocks without significant lateral movement.

3. In a portable power driven cutting tool, a frame, guide means in said frame, an elongated tool plunger in the frame which is supported in said guide means for endwise and rocking movement with respect to said frame, a power driven eccentric rotatably supported in the frame, a lever pivotally mounted on said eccentric, said lever having one end pivotally connected to the tool plunger in longitudinally spaced relationship to said guide means to provide the sole driving connection between the eccentric and the tool plunger, and restraining means linking the other end of the lever to restrain said lever to elliptical movement where it is pivotally connected to the tool plunger, whereby the outer end of the tool plunger may move in an elliptical path while the portion of said tool plunger which is supported in the guide means slides endwise and rocks without significant lateral movement.

4. In a portable power driven cutting tool, a frame, a motor in said frame which is provided with a drive shaft having a pinion thereon, a pivot support in the frame, a tool plunger in said frame parallel to said drive shaft, the inner end of said tool plunger making a sliding and rocking connection with said pivot support, an eccentric rotatably supported in the frame and making driving connection with said pinion, a lever pivotally mounted on said eccentric, said lever having one end pivotally connected to said tool plunger intermediate its ends, and restraining means linking the other end of the lever to said frame to restrain said lever to elliptical movement where it is pivotally connected to the tool plunger.

5. In a portable power driven cutting tool, a frame, a rock member in said frame having a slot therein, a tool plunger in the frame with its inner end slidably supported in the slot in said rock member so that it may move endwise and rock with respect to said frame, a power driven eccentric rotatably supported in the frame, a lever pivotally mounted on said eccentric, said lever having one end pivotally connected to the tool plunger intermediate its ends to provide the sole driving connection between the eccentric and the tool plunger, and a single link pivotally connected to said lever and said frame to restrain said lever to elliptical movement where it is pivotally connected to the tool plunger, whereby the outer end of the tool plunger may move in an elliptical path while the inner end of the tool plunger slides endwise and rocks without significant lateral movement.

6. In a portable power driven cutting tool, a frame, guide means in said frame, an elongated tool plunger in the frame which is supported in said guide means for endwise and rocking movement with respect to said frame, a power driven eccentric rotatably supported in the frame, a lever pivotally mounted on said eccentric, said lever having one end pivotally connected to the tool plunger in longitudinally spaced relationship to said guide means to provide the sole driving connection between the eccentric and the tool plunger, restraining means linking the other end of the lever to said frame to restrain said lever to elliptical movement where it is pivotally connected to the tool plunger, a tool support projecting outwardly from the frame, and a link pivoted to the outer end of said support, said link being provided with a pivot for attachment to the outer end of a tool secured to the tool plunger, whereby the outer end of the tool plunger may move in an elliptical path while the outer end of a tool secured to the tool plunger and to said link moves endwise and rocks without significant lateral movement.

7. In a portable power driven cutting tool, a frame, guide means in said frame, an elongated tool plunger in the frame which is supported in said guide means for endwise and rocking movement with respect to said frame, a power driven eccentric rotatably supported in the frame, a lever pivotally mounted on said eccentric, said lever having one end pivotally connected to the tool plunger in longitudinally spaced relationship to said guide means to provide the sole driving connection between the eccentric and the tool plunger, restraining means linking the other end of the lever to said frame to restrain said lever to elliptical movement where it is pivotally connected to the tool plunger, a tool support projecting outwardly from the frame, and resilient means secured to the outer end of said tool support to pivotally connect with the outer end of a tool secured to the tool plunger so as to tension said tool, whereby the outer end of the tool plunger may move in an elliptical path while the outer end of a tool secured to the tool plunger and to said link moves endwise and rocks without significant lateral movement.

8. In a portable power driven cutting tool, a frame, guide means in said frame, an elongated tool plunger in the frame which is supported in said guide means for endwise and rocking movement with respect to said frame, a power driven eccentric rotatably supported in the frame, a lever pivotally mounted on said eccentric, said lever having one end pivotally connected to the tool plunger in longitudinally spaced relationship to said guide means to provide the sole driving connection between the eccentric and the tool plunger, restraining means linking the other end of the lever to said frame to restrain said lever to elliptical movement where it is pivotally connected to the tool plunger, a tool support projecting outwardly from the frame, a link pivoted to the outer end of said tool support, said link being provided with a pivot for attachment to the outer end of a tool secured to the tool plunger, and spring means engaging said link to urge it outwardly for tensioning a cutting tool between the tool plunger and the link, whereby the outer end of the tool plunger may move in an elliptical path while the outer end of a tool secured to the tool plunger and to said link moves endwise and rocks without significant lateral movement.

References Cited in the file of this patent

UNITED STATES PATENTS

| | | |
|---|---|---|
| 323,789 | Chevallier | Aug. 4, 1885 |
| 447,075 | Kunkle | Feb. 24, 1891 |
| 2,609,015 | Saviola et al. | Sept. 2, 1952 |
| 2,619,133 | Vulliet-Durand | Nov. 25, 1952 |
| 2,630,148 | Ferguson | Mar. 3, 1953 |